United States Patent
Clark et al.

(10) Patent No.: US 8,628,121 B1
(45) Date of Patent: Jan. 14, 2014

(54) SYSTEM FOR USE IN A WELLBORE

(75) Inventors: David B. Clark, Kingwood, TX (US); Bryan Lane, Houston, TX (US)

(73) Assignee: Sino-America Petroleum Equipment International, LLC, Kingwood, TX (US)

( * ) Notice: Subject to any disclaimer, the term of this patent is extended or adjusted under 35 U.S.C. 154(b) by 408 days.

(21) Appl. No.: 12/974,700

(22) Filed: Dec. 21, 2010

(51) Int. Cl.
*F16L 15/00* (2006.01)

(52) U.S. Cl.
USPC ............ 285/334; 285/333; 285/355; 285/390

(58) Field of Classification Search
USPC ........................... 285/333–334, 355, 383, 390
See application file for complete search history.

(56) References Cited

U.S. PATENT DOCUMENTS

| | | | | | |
|---|---|---|---|---|---|
| 4,384,737 | A | * | 5/1983 | Reusser | 285/334 |
| 4,696,498 | A | * | 9/1987 | Church | 285/334 |
| 5,137,310 | A | * | 8/1992 | Noel et al. | 285/333 |
| 6,478,344 | B2 | * | 11/2002 | Pallini et al. | 285/333 |
| 2003/0025327 | A1 | * | 2/2003 | Mannella | 285/334 |

* cited by examiner

*Primary Examiner* — Aaron Dunwoody
*Assistant Examiner* — Fannie Kee
(74) *Attorney, Agent, or Firm* — Buskop Law Group, PC; Wendy Buskop

(57) ABSTRACT

A system for use in a wellbore using a tubing string formed from a plurality of connected tubulars. The tubulars are connected by a tubular threaded seal connector. The tubular threaded seal connector includes a coupling body. A first seal engagement portion is formed on the coupling body adjacent to a first shoulder formed on a portion of the J-area, and second seal engagement portion is formed on the coupling body adjacent a second shoulder formed on another portion of the J-area.

5 Claims, 4 Drawing Sheets

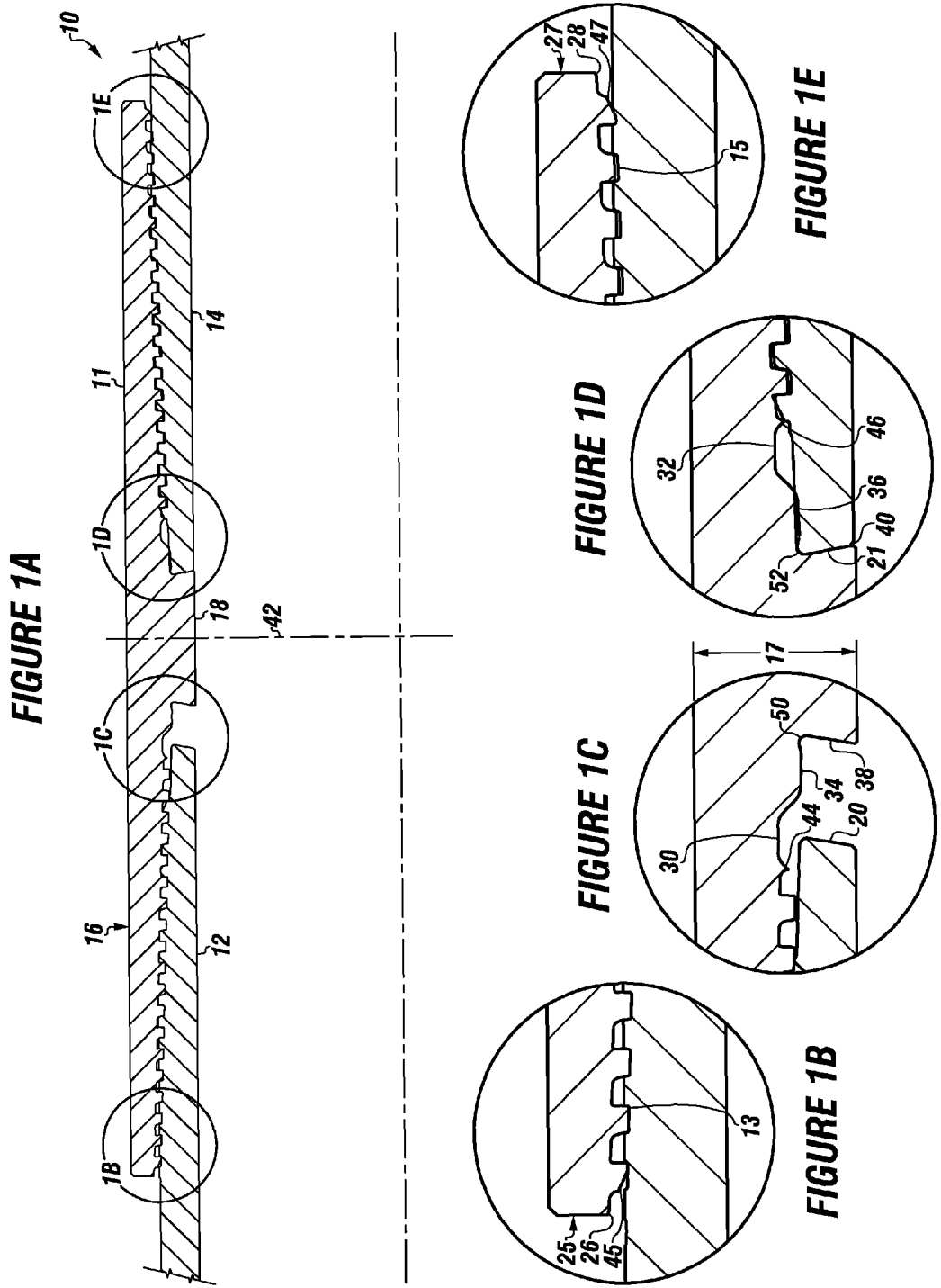

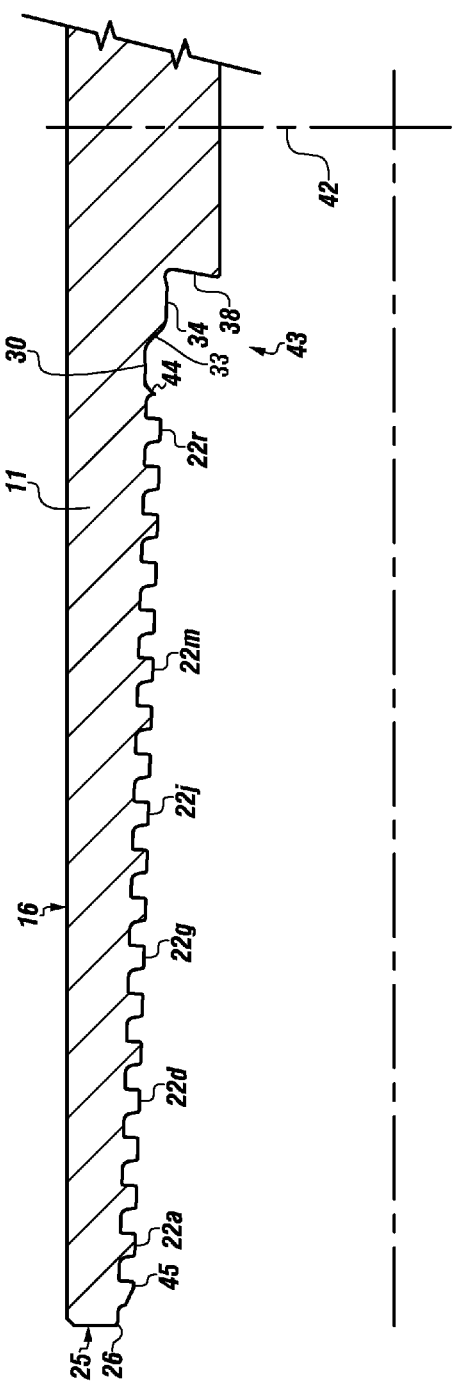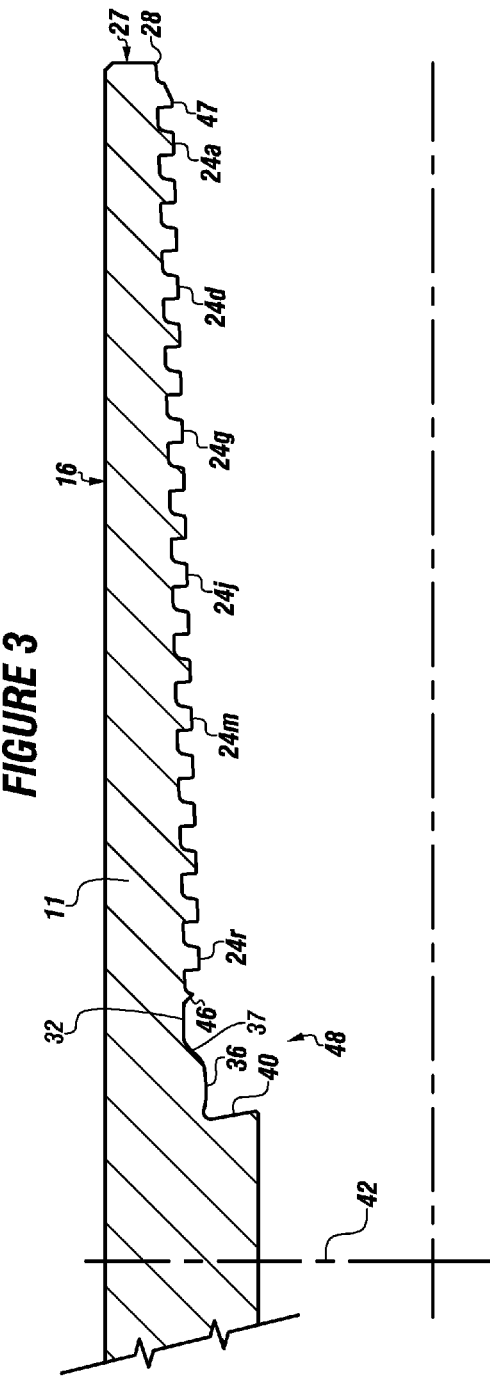

SYSTEM FOR USE IN A WELLBORE

FIELD

The present embodiments generally relate to a system for use in a wellbore.

BACKGROUND

A need exists for a system for use in a wellbore that uses a threaded seal connector that has an extended seal length and minimizes torque applied to tubulars being coupled together.

A further need exists for a system for use in a wellbore that uses a threaded seal connector that can use known API standards, and can be used to create common industry accepted thread.

A need also exists for a system for use in a wellbore that uses a threaded seal connector that can use imperfect first threads and imperfect last threads to ensure a quick and easy engagement, also known as "make up" between the tubulars and the couplings.

In addition, a need exists for a system for use in a wellbore that uses a threaded seal connector that can be used with common tubular sizes for a superior seal, and has a high pin nose yield. For example, tubulars that have outer diameters between 3 inches and 10 inches, such as 4.5 inches, 5 inches, 5.5 inches, 7 inches, 7 and ⅝th inches and 9 and ⅝th inches can be used with this coupling for sealing that has a high pin nose yield. For example, a tubular with an upper grade of P-110 steel and a 5.5 inch 20 foot pound coupling can support an excess of 22,000 foot/lbs of torque. The couplings with this design yield four times the make up torque used as standard buttress torque for standard tubular sizes with currently known couplings.

The present embodiments meet these needs.

BRIEF DESCRIPTION OF THE DRAWINGS

The detailed description will be better understood in conjunction with the accompanying drawings as follows:

FIG. 1A depicts a cross sectional view of the tubular threaded seal connector according to one or more embodiments.

FIG. 1B depicts a detailed view of a first coupling end of the tubular threaded seal connector of FIG. 1A.

FIG. 1C depicts a detailed view of a first anti-galling relief portion of the tubular threaded seal connector of FIG. 1A.

FIG. 1D depicts a detailed view of a second anti-galling relief portion of the tubular threaded seal connector of FIG. 1A.

FIG. 1E depicts a detailed view of a second coupling end of the tubular threaded seal connector of FIG. 1A.

FIG. 2 depicts a detailed view of a first half of the coupling body.

FIG. 3 depicts a detailed view of a second half of the coupling body according to one or more embodiments.

Figure 4:
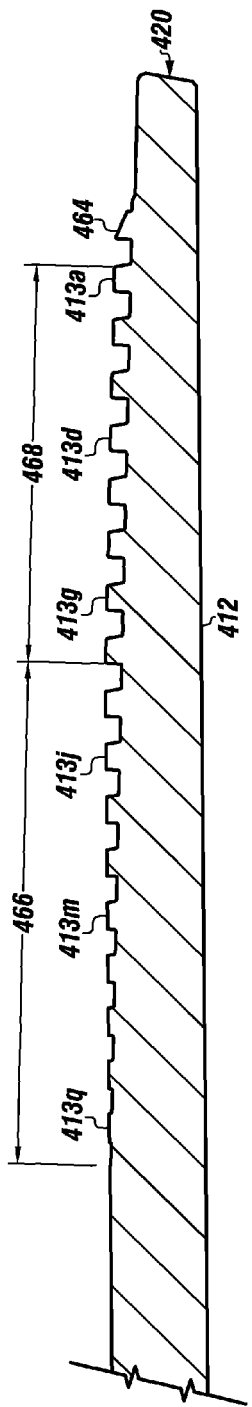
FIG. 4 depicts a detailed view of a portion of a tubular according to one or more embodiments.

The present embodiments are detailed below with reference to the listed Figures.

DETAILED DESCRIPTION OF THE EMBODIMENTS

Before explaining the present system, in detail, it is to be understood that the system is not limited to the particular embodiments and that it can be practiced or carried out in various ways.

The present embodiments generally relate to a system for use in a wellbore.

The system can be used to complete, test, or fracture a wellbore using a tubing string formed from a plurality of connected tubulars. The system can connect the tubulars using a tubular threaded seal connector. The tubulars can be made up to a predefined torque specification.

The tubular threaded seal connector can include a coupling body. The coupling body can have an outer surface. The outer surface of the coupling body can have a machine finish. The coupling body can operatively engage a first tubular member and a second tubular member.

The coupling body can include a first coupling end and a second coupling end. The coupling body can have a length of from about 8 inches to about 12 inches. The radial width of the coupling body can be from about 0.3 inch to about 0.9 inch.

A first chamfer can be adjacent to the first coupling end, and a second chamfer can be adjacent to the second coupling end.

One or more first imperfect first threads can be formed proximate to the first coupling end, and one or more second imperfect first threads can be formed proximate to the second coupling end. In one or more embodiments, the imperfect first threads can be formed no more than ⅜ of an inch from the adjacent coupling end.

A plurality of first coupling threads can be formed between the first imperfect first thread and the first imperfect last thread. As such, a first threaded engagement portion can be formed. The first threaded engagement portion can be configured to connect to the first tubular member. The plurality of first coupling threads can be standard buttress threads. The first coupling threads can have a density of about 5 threads per inch.

The first coupling threads can be formed along the coupling body at an angle of about 1.78 degrees off the coupling body axis.

A plurality of second coupling threads can be formed between the second first imperfect first thread and a second imperfect last thread. As such, a second threaded engagement portion can be formed. The second threaded engagement portion can be configured to connect to the second tubular member. The plurality of second coupling threads can be standard buttress threads. The second coupling threads can have a density of about 5 threads per inch.

The second coupling threads can be formed along the coupling body at an angle of about 1.78 degrees off the coupling body axis.

A first relief groove can be formed in the coupling body opposite the first imperfect last thread; a second relief groove can be formed in the coupling body opposite the second imperfect last thread. The relief grooves can be configured to reduce failures associated with excess thread compound used during make up of tubular strings. For example, the relief grooves can catch or contain excess thread compound.

A first anti-galling seal can be formed in the coupling body adjacent to the first relief groove; a second anti-galling seal can be formed in the coupling body adjacent to the second relief groove. The anti-galling seals can have a length configured to reduce the amount of metal to metal rotation as the tubulars are connected to the tubular threaded seal connector. For example, the length can be half of the pitch length of the tubular member threads allowing the seal to be seated in less than about two turns. In one or more embodiments, the length can be from about 0.06 inch to about 0.18 inch.

A first shoulder and a second shoulder can be formed in the coupling body at an acute angle of less than 100 degrees and more than 70 degrees to the anti-galling seals. For example, the first shoulder can be formed in the coupling body at an angle from about 70 degrees to about 100 degrees from a plane of the first anti-galling seal.

The coupling body can have a J-area. The J-area can be configured to provide torque resistance when the first and second tubulars sealingly engage the first and second coupling threads and touch the first and second shoulders on the coupling.

A pair of seal engagement portions can be formed on the coupling body. The pair of seal engagement portions can be minimized in length to reduce the overall length of the coupling body. The shoulder can allow precision make up, allowing for the shortening of the seal engagement portions. As such, the cost of the tubular threaded seal connector can be reduced.

The tubular threaded seal connector can include one or more pairs of anti-galling relief portions. One or more of the anti-galling relief portions can be formed between one or more anti-galling seals and one or more first shoulders.

The tubular threaded seal connector can also include one or more pairs of seal guide surfaces. One or more pairs of seal guide surfaces can be located between one or more relief grooves and one or more anti-galling seals.

The tubular threaded seal connector can also include one or more pairs of anti-galling tapers located between one or more of the anti-galling relief portions and one or more of the anti-galling seals.

The tubulars can be downhole tubular members, such as production tubing, casing tubing, or other tubular members. The first tubular and the second tubular can have a pin nose and a tubular thread. The pin nose and tubular thread can allow for a seal to be formed between the tubulars and coupling threads. Shoulder breaks can be formed on each of the pin noses. For example, a first shoulder break can be formed on a first pin nose of the first tubular, and a second shoulder break can be formed on a second pin nose of the second tubular.

The tubulars can have a casing pin nose radius. The casing pin nose radius can be from about 0.025 inch to about 0.035 inch.

The tubulars can also include a first imperfect tubular thread. For example, an imperfect thread zone can be formed on one or more of the tubulars by a plurality of first imperfect tubular threads.

The tubulars can also have a perfect thread zone. The perfect thread zone can be formed by a plurality of prefect threads.

A pin face seal can be formed on the tubulars between the casing pin nose radius and the first imperfect pipe thread. The pin face seal can form a radial interference seal between the pin face seal and the anti-galling seal.

FIG. 1A depicts a cross sectional view of the tubular threaded seal connector according to one or more embodiments. FIG. 1B depicts a detailed view of a first coupling end of the tubular threaded seal connector of FIG. 1A. FIG. 1C depicts a detailed view of a first anti-galling relief portion of the tubular threaded seal connector of FIG. 1A. FIG. 1D depicts a detailed view of a second anti-galling relief portion of the tubular threaded seal connector of FIG. 1A. FIG. 1E depicts a detailed view of a second coupling end of the tubular threaded seal connector of FIG. 1A.

FIG. 2 depicts a detailed view of a first half of the coupling body. FIG. 3 depicts a detailed view of a second half of the coupling body.

Referring now to FIGS. 1A-1E, 2, and 3, the tubular threaded seal connector 10 can include a coupling body 11, a first coupling end 25, a second coupling end 27, a first chamfer 26, a second chamfer 28, a first relief groove 30, a second relief groove 32, a first anti-galling seal 34, a second anti-galling seal 36, a first shoulder 38, a second shoulder 40, a first imperfect first thread 45, a first imperfect last thread 44, a second imperfect first thread 47, a second imperfect last thread 46, a first anti-galling relief portion 50, a second anti-galling relief portion 52, and a J-area 18. The coupling body 11 can have a coupling body axis 42.

The coupling body 11 can have any length. For example, the coupling body can be 9 inches in length. The coupling body can have an outer surface 16. The outer surface 16 can have a machine finish. In one or more embodiments, the outer surface can have a coating or other treatment. For example, the outer surface can be coated with a corrosion resistant substance. The coupling body can have a coupling body radial width 17.

The coupling ends 25 and 27 can be located on portions of the coupling body 11. For example, the first coupling end 25 can be on a left or upper portion of the coupling body 11, and the second coupling end 27 can be on a right or lower portion of the coupling body 11. The coupling ends 25 and 27 can be configured to operatively engage a tubular, such as a first tubular 12 and second tubular 14. The first tubular 12 and the second tubular 14 can be any commercially available tubular member. For example, the first tubular 12 and the second tubular 14 can be similar to one or more of the tubulars described herein.

The first chamfer 26 can be located on a portion of the first coupling end 25. The second chamfer 28 can be located on a portion of the second coupling end 27.

The first imperfect first thread 45 can be formed on the first coupling end 25 adjacent to the first chamfer 26. The first imperfect last thread 44 can be located on the first coupling end distal from the first chamfer. A plurality of first coupling threads 22a-22r can be located between the first imperfect last thread 44 and the first imperfect first thread 45.

The second imperfect first thread 47 can be formed on the second coupling end 27. The second imperfect first thread 47 can be adjacent to the second chamfer 28. The second imperfect last thread 46 can be distal from the second chamfer 28. A plurality of second coupling threads 24a-24r can be located between the second imperfect first thread 47 and the second imperfect last thread 46.

A first seal engagement portion 43 can be located adjacent the first imperfect last thread 44, and a second seal engagement portion 48 can be located adjacent the second imperfect last thread 46. The first seal engagement portion 43 can include a first relief groove 30, and the second seal engagement portion 48 can include a second relief groove 32. The first relief groove 30 can be located adjacent to the first imperfect last thread 44, and the second relief groove 32 can be located adjacent to the second imperfect last thread 46.

The first anti-galling seal 34 can be adjacent to the first relief groove 30. The second anti-galling seal 36 can be adjacent to the second relief groove 32. A first seal guide surface 33 can connect the first anti-galling seal 34 with the first relief groove 30. A second seal guide surface 37 can connect the second anti-galling seal 36 and the second relief groove 32.

The first anti-galling relief portion 50 can be located adjacent to the first relief groove 30. The second anti-galling relief portion 52 can be located adjacent to the second relief groove 32.

The shoulders 38 and 40 can be located on the coupling body 11. For example, the first shoulder 38 can be adjacent to the first anti-galling relief portion 50, and the second shoulder 40 can be adjacent to the second anti-galling relief portion 52. The first anti-galling relief portion 50 can connect the first shoulder 38 to the first anti-galling seal 34, and the second anti-galling relief portion 52 can connect the second shoulder 40 to the second anti-galling seal 36.

The J-area 18 can be configured to support the shoulders to prevent yielding of the coupling. The J-area 18 can be located between the shoulders 38 and 40.

The first tubular 12 can connect to the first coupling end 25, and the second tubular 14 can connect to the second coupling end 27. The first tubular 12 can have a plurality of first tubular threads 13. The second tubular 14 can have a plurality of second tubular threads 15. The plurality of tubular threads 15 and 13 can be helix shaped. The plurality of tubular threads 15 and 13 can be continuous threads.

The first tubular 12 can have a first pin nose 20, and the second tubular 15 can have a second pin nose 21. The pin noses 20 and 21 can be at angles of from about 5 degrees to about 15 degrees perpendicular to the axis of the associated tubular.

FIG. 4 depicts a detailed view of a portion of a tubular according to one or more embodiments. The tubular 412 can include a pin nose 420. The pin nose 420 can be located on one of the ends of the tubular 412. The tubular 412 can also have a first imperfect tubular thread 464. The first imperfect tubular thread 464 can be adjacent to the pin nose 420. The tubular 412 can also include a perfect thread zone 468 and an imperfect thread zone 466. The perfect thread zone 468 can have from about 6 to about 10 threads. The tubular 412 can include one or more tubular threads, such as tubular threads 413a-413q.

Figure 5:
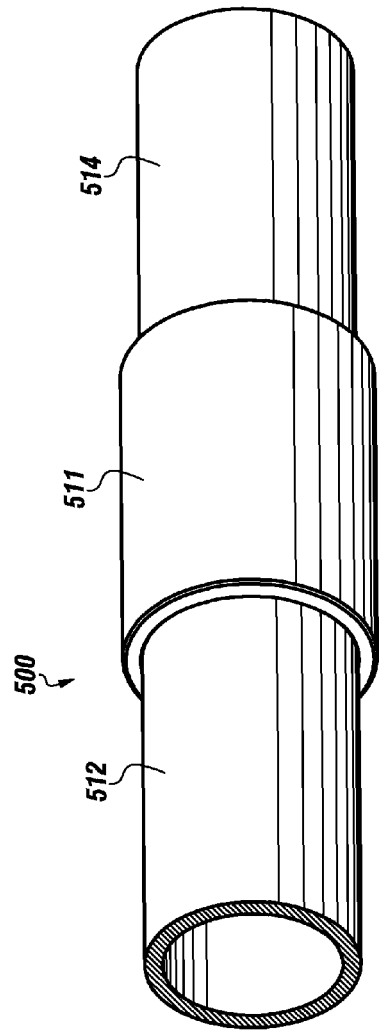
FIG. 5 depicts a portion of a tubing string for use in a wellbore according to one or more embodiments.

FIG. 5 depicts a portion of a tubing string for use in a wellbore according to one or more embodiments. The portion of tubing string 500 can include a first tubular 512 and a second tubular 514, which can be similar to one or more tubulars disclosed herein. The tubulars 512 and 514 can be coupled to one another by the threaded seal connector 511. The threaded seal connector 511 can be similar to one or more embodiments of the threaded seal connector 511 disclosed herein.

The threaded seal connector 511 can provide an extended seal length and minimize torque applied to tubulars 512 and 514 being coupled together. The threaded seal connector 511 can use known API standards, and can be used to create common tubular industry accepted thread.

The threaded seal connector 511 can also use imperfect first threads and imperfect last threads to ensure a quick and easy engagement, also known as "make up" between the tubulars and the couplings.

In addition, the threaded seal connector 511 can be used with common tubular sizes for a superior seal, and can have a high pin nose yield. For example, tubulars that have outer diameters between 3 inches and 10 inches, such as 4.5 inches, 5 inches, 5.5 inches, 7 inches, 7 and 5/8th inches and 9 and 5/8th inches can be used with threaded seal connector 511 for sealing that has a high pin nose yield. For example, a tubular with an upper grade of P-110 steel and a 5.5 inch 20 foot pound coupling can support an excess of 22,000 foot/lbs of torque.

Figure 6:
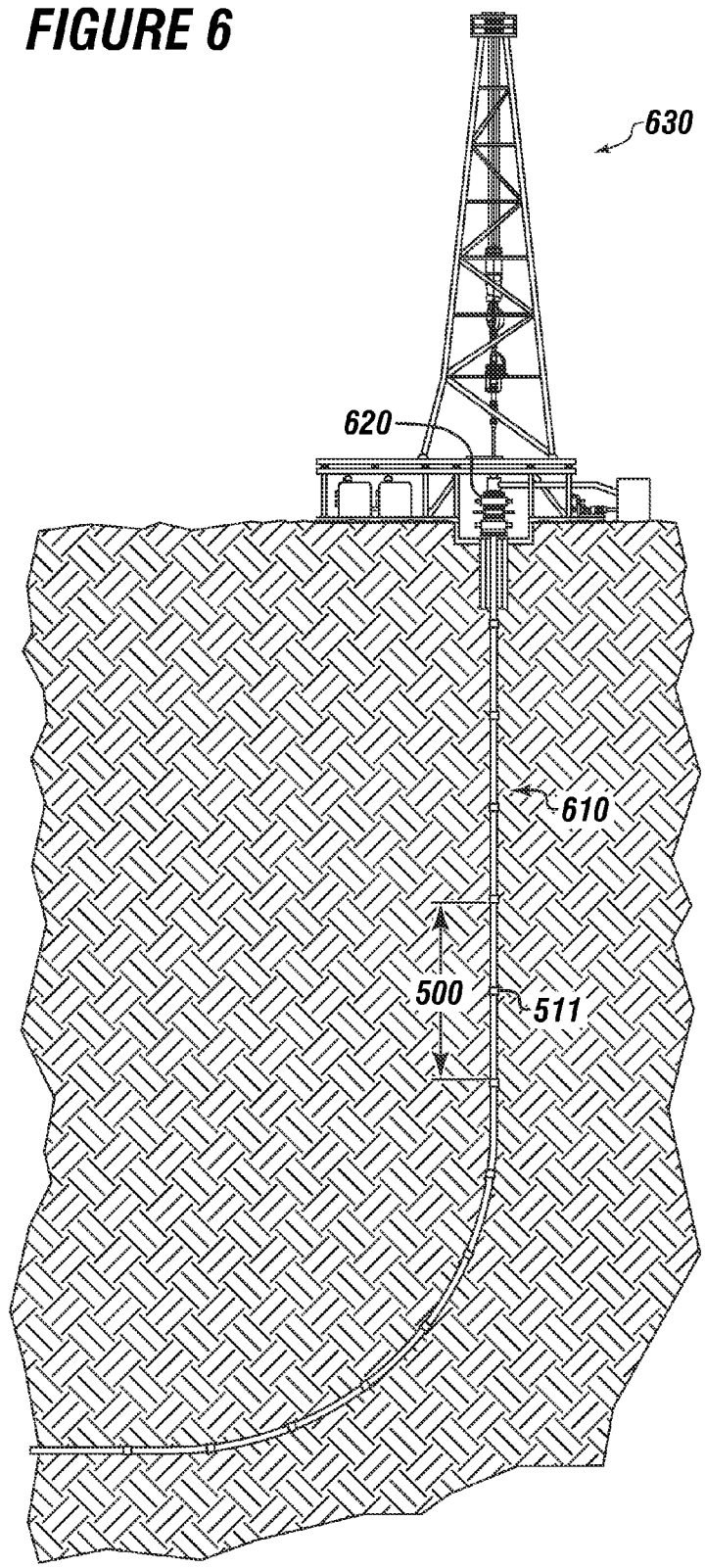
FIG. 6 depicts a tubing string in a wellbore.

FIG. 6 depicts a tubing string in a wellbore according to one or more embodiments. The tubing string can be placed in any wellbore, such as a vertical or horizontal wellbore. Referring to FIGS. 5 and 6, a drilling rig 630 can be used to locate the tubing string 610 in a wellbore. The wellbore can be formed through shale or other formation. The tubing string can be supported by a tubing hanger 620.

The tubing string can include a plurality of tubing string portions 500. The tubing string portions can include the threaded seal connector 511. The threaded seal connector 511 can couple the first tubular 512 to the second tubular 514, as depicted in FIG. 5.

While these embodiments have been described with emphasis on the embodiments, it should be understood that within the scope of the appended claims, the embodiments might be practiced other than as specifically described herein.

What is claimed is:

1. A system for use in a wellbore, wherein the system comprises:
 a. a tubular threaded seal connector comprising:
  (i) a coupling body, wherein the coupling body comprises:
   1. a first coupling end;
   2. a second coupling end; and
   3. a J-area located between the first coupling end and the second coupling end;
  (ii) a first chamfer formed on the coupling body adjacent to the first coupling end;
  (iii) a first seal engagement portion formed on the coupling body adjacent to a first shoulder formed on a portion of the J-area, wherein the first seal engagement portion comprises:
   1. a first anti-galling seal connected with the first shoulder by a first anti-galling relief portion; and
   2. a first relief groove connected with the first anti-galling seal by a first seal guide surface;
  (iv) a first threaded engagement portion formed on the coupling body between the first chamfer and the first seal engagement portion, wherein the first threaded engagement portion comprises a first imperfect first thread adjacent the first chamfer and a first imperfect last thread adjacent the first seal engagement portion;
  (v) a second chamfer formed on the coupling body adjacent to the second coupling end;
  (vi) a second seal engagement portion formed on the coupling body adjacent to a second shoulder formed on another portion of the J-area, wherein the second seal engagement portion comprises:
   1. a second anti-galling seal connected with the second shoulder by a second anti-galling relief portion; and
   2. a second relief groove connected with the second anti-galling seal by a second seal guide surface;
  (vii) a second threaded engagement portion formed on the coupling body between the second chamfer and the second seal engagement portion, wherein the second threaded engagement portion comprises a second imperfect first thread adjacent the second chamfer and a second imperfect last thread adjacent the second seal engagement portion;
 b. a first tubular connected with the first coupling end;
 c. a second tubular connected with the second coupling end; and wherein the system minimizes torque applied to the first and second tubulars being coupled to the threaded seal connector.

2. The system of claim 1, wherein the first shoulder is at an acute angle of less than 100 degrees and more than 70 degrees to the first anti-galling seal.

3. The system of claim 1, wherein the second shoulder is at an acute angle of less than 100 degrees and more than 70 degrees to the second anti-galling seal.

4. The system of claim 1, wherein the first anti-galling seal has a length from 0.06 inch to 0.18 inch.

5. The system of claim 1, wherein the second anti-galling seal has a length from 0.06 inch to 0.18 inch.

* * * * *